3,033,902
ARYLSULFONYLUREAS

Gerald F. Holland and William M. McLamore, Groton, Conn., assignors to Chas. Pfizer & Co., Inc., New York, N.Y., a corporation of Delaware
No Drawing. Filed Jan. 7, 1960, Ser. No. 921
6 Claims. (Cl. 260—553)

This invention relates to new and useful arylsulfonylureas which are effective in lowering blood sugar levels. More particularly, it is concerned with N-(p-chlorobenzenesulfonyl) - N'-(p - dimethylaminophenyl)urea, salts thereof and the method of reducing blood sugar levels in in a diabetic subject by the use of said sulfonylurea or its pharmaceutically acceptable salts.

In accordance with the present invention, N-(p-chlorobenzenesulfonyl)-N'-(p - dimethylaminophenyl)urea and certain salts thereof have been found to be valuable as agents for lowering blood sugar levels when administered orally to animals. Moreover, the advantages offered by the pharmacologically acceptable compounds of this invention are manifold: for instance, they may be administered orally as aforesaid, thereby eliminating parenteral administration which is often very painful and irritating; they are extremely effective in lowering blood sugar levels in animals, including humans, to a very high degree and for a sustained period of time; toxic side effects have been found to be either minimal or absent; pharmacological investigation reveals no evidence of kidney damage or crystalluria; moreover, these compounds readily lend themselves to the preparation of suitable oral dosage formulations; and finally, they may be easily prepared in good yield from readily available starting materials by any number of synthetic organic methods which are rather convenient and economical.

N-(p-chlorobenzenesulfonyl)- N'-(p - dimethylaminophenyl)urea is a colorless crystalline compound of an amphoteric character, which is insoluble in water and dilute aqueous acid, but very soluble in aqueous alkali and acid, and moderately soluble in most common organic solvents, such as ethanol, acetone, chloroform, diethyl ether, benzene, and so forth. The product melts with decomposition at 160° C. and its chemical structural formula is as follows:

As previously indicated, the above compound can be readily synthesized by those having skill in the art. For instance, general preparative methods which are applicable for such a purpose include those synthetic routes which involve the reaction of p-chlorobenzenesulfonyl isocyanate with p-dimethylaminoaniline or conversely, the reaction of p-chlorobenzenesulfonamide with p-dimethylaminophenyl isocyanate or with compounds which can be converted into such an isocyanate during the course of the reaction; or the reaction of p-chlorobenzensulfonyl-urethane with p-dimethylaminoaniline or conversly, the reaction of p-chlorobenzenesulfonamide with p-dimethylaminophenylurethane; or the reaction of p-chlorobenzenesulfonamide with N-(p-dimethylaminophenyl)carbamyl chloride; or the conversion of p-chlorobenzenesulfonylurea to the desired N'-substituted compound by means of p-dimethylaminoaniline; or the reaction of p-chlorobenzenesulfonamide with N,N'-di(p-dimethylaminophenyl)-urea; or the reaction of p-chlorobenzenesulfonyl chloride with the corresponding isourea in the form of a suitable salt, followed by acid hydrolysis of the resulting intermediate; or the reaction of p-chlorobenzenesulfonyl chloride with N,N'-di(p-dimethylaminophenyl)thiourea or the corresponding substituted guanidine by either first desulfurizing or hydrolyzing these respective reagents or by employing them as such, followed by respective desulfurization or hydrolysis to the desired compound.

Preferred synthetic routes include the reaction of p-chlorobenzenesulfonamide with p-dimethylaminophenyl isocyanate in accordance with a modification of the procedure of F. Kurzer [Journal of the Chemical Society (London), 1951, p. 1258], employing a strongly basic organic amine, such as triethylamine, as a catalyst; another preferred method of synthesis, which is even more desirable from the standpoint of yields, involves the reaction of an alkali metal or alkaline-earth metal salt of p-chlorobenzenesulfonamide with either a trisubstituted urea such as $(R)_2NCONHC_6H_4N(CH_3)_2$ or with an aryl N-monosubstituted carbamate or a corresponding thiolcarbamate such as $RXCONHC_6N_4N(CH_3)_2$, where X is either oxygen or sulfur, and R is an aryl group such as phenyl, p-chlorophenyl, p-bromophenyl, p-nitrophenyl, p-acetylaminophenyl, p-tolyl, p-anisyl, α-naphthyl, β-naphthyl, and the like.

In accordance with a more specific embodiment of the present invention with reference to the preferred method of synthesis, a p-chlorobenzenesulfonamide salt is reacted with a N,N-diaryl-N'-(p-dimethylaminophenyl)urea or an aryl N-(p-dimethylaminophenyl)carbamate or thiolcarbamate of the type previously referred to, as is illustrated below by the following equations wherein M represents the cation of an alkali metal salt and X is either oxygen or sulfur as aforesaid:

$p\text{-ClC}_6H_4SO_2NHM + (R)_2NCONHC_6H_4N(CH_3)_2$
$\rightarrow p\text{-ClC}_6H_4SO_2NMCONHC_6H_4N(CH_3)_2 + (R)_2NH$ $p\text{-ClC}_6H_4SO_2NHM + p\text{-}(CH_3)_2NC_6H_4NHCOXR$
$\rightarrow p\text{-ClC}_6H_4SO_2NHCONHC_6H_4N(CH_3)_2 + RXM$ This reaction is preferably conducted in the presence of a reaction-inert polar organic solvent; typical organic solvents useful in this connection include N,N-di-lower alkyl substituted lower aliphatic hydrocarbon carboxamides such as dimethylformamide, dimethylacetamide, diethylformamide, diethylacetamide, and the like, as well as lower dialkyl sulfoxides and sulfones such as dimethyl sulfoxide, diethyl sulfoxide, di-isopropyl sulfoxide, di-n-propyl sulfoxide, dimethyl sulfone, diethyl sulfone, di-isopropyl sulfone, di-n-propyl sulfone, and the like. It is desirable that the aforementioned solvent be present in sufficient amount to dissolve each of the previously referred to starting materials. In general, the reaction is carried out at a temperature in the range of from about 20° C. to about 150° C. for a period of about one-half to about ten hours. Recovery of the desired product is most conveniently accomplished by first diluting the reaction solution with water and then adjusting the resulting aqueous solution to a pH that is at least above pH 8.0, followed by subsequent extraction of the basic aqueous solution with any water immiscible solvent in order to remove minor amounts of unreacted or excess organic reagent that might possible be present. Isolation of the desired N - (p - chlorobenzenesulfonyl) - N'-(p-dimethylaminophenyl)urea from the basic aqueous layer was then effected by the addition thereof to a dilute aqueous acid solution, wherein the acid is present in sufficient amount to cause precipitation of the desired sulfonylurea from solution.

In connection with a more detailed consideration of this preferred method of synthesis, the relative amounts of the agents employed is such that the molar ratio of the p-chlorobenzenesulfonamide salt to either the N,N-diaryl-N'-(p-dimethylaminophenyl)urea or aryl N-(p-dimethylaminophenyl)carbamate or thiolcarbamate is desirably in the preferred range of from about 1:1 to 3:1, although substantially equimolar ratios afford satisfactory results in this reaction. Nevertheless, an excess of the trisubstituted urea or aryl N-mono-substituted carbamate or thiolcarbamate is usually employed inasmuch as this not only aids in shifting the reaction equilibrium to the product side of the equation, but it is also advantageous in that the excess reagent is easily removed after completion of the reaction by means of the solvent extraction step previously referred to. Moreover, it is to be noted that the formation of the diarylamine or phenolic or aryl mercaptan by-products is greatly enhanced by the overall basic character of the reaction mixture.

The starting materials necessary for the process of this invention are compounds which are either well-known in the prior art or else they are commercially available or easily prepared in accordance with standard organic procedures previously described in the chemical literature. For instance, p-chlorobenzenesulfonamide can either be commercially obtained or it can be readily prepared by ammonolysis of the corresponding sulfonyl chloride; the latter compound can either be synthesized directly from chlorobenzene by treatment of this compound with chlorosulfonic acid or it can be prepared from the readily available p-chlorobenzenesulfonic acid sodium salt by the use of phosphorus pentachloride. The p-chlorobenzenesulfonamide so obtained is easily converted to the corresponding salts employed in this reaction by any number of standard and convenient procedures; for instance, the p-chlorobenzenesulfonamide salt may be prepared by dissolving the corresponding sulfonamide in a solution or an aqueous suspension of an alkali metal or alkaline-earth metal base, such as sodium hydroxide, potassium hydroxide or calcium hydroxide, or with a strong basic salt such as sodium carbonate, and then evaporating the resulting mixture to dryness. Alternatively, p-chlorobenzenesulfonamide may be treated in an anhydrous alcoholic solvent medium at room temperature with at least an equivalent amount in moles of the desired alkali metal or alkaline-earth metal alkoxide; the p-chlorobenzenesulfonamide salts so produced are obtained in almost quantitative yields and they can be conveniently isolated from the reaction solution by means of precipitation with a suitable anti-solvent, such as any relatively non-polar organic solvent, e.g. diethyl ether, chloroform, etc. Incidentally, it is even possible to employ the free p-chlorobenzenesulfonamide as such by placing this compound in the usual solvent medium together with an alkali metal or alkaline-earth metal base and the N,N-diaryl-N'-(p-dimethylaminophenyl)urea or aryl N-(p-dimethylaminophenyl)carbamate or thiolcarbamate; in this case, the p-chlorobenzenesulfonamide salt is first formed in situ and then reacts with one of the aforementioned starting materials.

The other major starting materials required for this reaction, viz., the N,N-diaryl-N'-(p-dimethylaminophenyl)ureas or the aryl N-(p-dimethylaminophenyl)carbamate or thiolcarbamates are all readily prepared from common organic reagents by employing standard procedures. For instance, the tri-substituted urea may be prepared in accordance with the general procedure described by Reudel in the Recueil des Travaux Chimiques des Pays-Bas, Vol. 33, p. 64 (1914), which is illustrated below by the following equation wherein R is the aryl group previously defined:

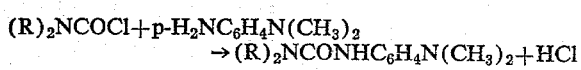

The two reactants stated in the above equation can easily be prepared by those skilled in the art from readily available starting materials in accordance with classical organic procedures, such as those presented by Houben-Weyl in Die Methoden der organischen Chemie, Fourth Edition, Verlag Georg Thieme (1952), Vol. VIII, p. 117. In the case of the aryl N-(p-dimethylaminophenyl)carbamates or thiolcarbamates, application of the well-known Schotten-Baumann technique is extremely suitable; this approach is illustrated below by the following equation wherein R is the aforementioned aryl group:

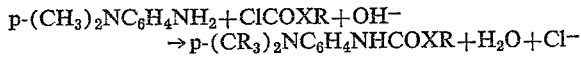

In connection with the synthesis of the above aryl chlorocarbamate, it is well known in the art the chlorocarbamates in general are prepared by reacting the appropriate alcohol (phenol) with an equimolar amount of phosgene; in like manner, the corresponding chlorothiolcarbamates are obtained by merely employing an appropriate aryl mercaptan (thiophenol) in place of the corresponding hydroxy compound in this same reaction step.

Insofar as N-(p-chlorobenzenesulfonyl)-N'-(p-dimethylaminophenyl)urea is an amphoteric compound, it is capable of forming a wide variety of salts with various acids and bases. In practice, it is preferable to employ a strong acid or base for such purposes in view of the nature of the compound which is to be reacted. Although such salts must be pharmaceutically acceptable as the final products are intended for oral human consumption, it is possible to first isolate the desired sulfonylurea from the reaction mixture in the form of a pharmaceutically unacceptable salt and subsequently convert the latter salt to the free amphoteric compound by treatment with either acid or base as the case may be; the free N-(p-chlorobenzenesulfonyl)-N'-(p-dimethylaminophenyl)urea so obtained is then converted to a pharmaceutically acceptable salt thereof in the manner hereinafter indicated.

For instance, the acid and base salts of the sulfonylurea of this invention may be prepared by treating the amphoteric compound with a substantially equimolar amount of the chosen acid or base. The salt-formation step can be carried out in aqueous solution or in a suitable organic solvent such as methanol or ethanol. Upon careful evaporation of the solvent, the solid salt is obtained. Alternatively, other recovery techniques are also applicable, such as freeze-drying when the solvent is water or the use of an anti-solvent in the case of organic solution, e.g., the addition of diethyl ether to a methanolic solution of the product will cause precipitation of the salt to occur.

The acids which are used to prepare the pharmaceutically acceptable acid addition salts of N-(p-chlorobenzenesulfonyl)-N'-(p-dimethylaminophenyl)urea are those which form non-toxic acid addition salts containing pharmaceutically acceptable anions, such as the hydrochloride, hydrobromide, hydriodide, nitrate, sulfate or bisulfate, phosphate or acid phosphate, acetate, lactate, citrate or acid citrate, tartrate or bitartrate, oxalate, succinate and maleate salts.

The bases which are used to prepare the pharmaceutically acceptable base salts of N-(p-chlorobenzenesulfonyl)-N'-(p-dimethylaminophenyl)urea are those which form non-toxic salts containing pharmaceutically acceptable cations, such as the alkali metal, alkaline-earth metal, ammonium or water-soluble amine addition salts like the lower alkanolammonium and other base salts with organic amines which are compatible with the human system. Preferred members of this group include the sodium, potassium, magnesium, calcium and ethanolammonium salts. Some of these salts such as the sodium, magnesium and ethanolammonium salts are especially valuable in view of their water-solubility.

As previously mentioned, N-(p-chlorobenezensulfonyl)-N'-(p-dimethylaminophenyl)urea is a compound which is readily adapted to therapeutic use as an oral antidiabetic agent. Furthermore, the toxicity of this compound has been found to be quite low, as aforesaid, when orally administered to mice in amounts which are sufficient to achieve the desired results; moreover, no harmful pharmacological side effects, such as crystalluria or kidney damage, have been observed as a result of such administration. The hypoglycemic activity of N-(p-chlorobenzenesulfonyl) - N' - (p - dimethylaminophenyl)urea is well illustrated by the tests hereinafter described, wherein intact male albino rats, each weighing approximately 150 grams are the experimental animals employed for such purposes. The test animals are fasted approximately 20–24 hours prior to oral administration of the drug, and food is also withheld from them throughout the entire test period. Blood sugar levels are determined as glucose on tail blood samples at two and four hour intervals in accordance with the micro method of Folin-Malmros, and groups of control and treated rats are sacrificed after each determination. The treated animals are given N-(p-chlorobenzenesulfonyl)-N'-(p-dimethylaminophenyl)urea at the 100 mg./kg. dosage level; in each instance, the drug is suspended in a 1% carboxymethylcellulose solution and the doses are administered in a volume of 4 ml./kg. In every case, the control rats are given the vehicle alone, and the results obtained are expressed in terms of the percentage decrease in the fasting blood glucose value from the control pre-treatment value. In this connection, it is significant to note that these results show N-(p-chlorobenzenesulfonyl)-N'-(p-dimethylaminophenyl)urea exhibits a hypoglycemic effect which is comparable to that of N-(p-chlorobenzenesulfonyl)-N'-n-propylurea (chlorpropamide), which is the most highly effective oral anti-diabetic agent yet known. Data illustrating the results of acute toxicity tests performed in conjunction with clinical testing indicate the N-(p-chlorobenzenesulfonyl)-N'-(p-dimethylaminophenyl)urea can be considered relatively non-toxic. Incidentally, microscopic examination of urine samples collected five and twenty-five hours after oral administration to such animals reveals the absence of any crystalluria or kidney damage as aforementioned.

In accordance with a method of treatment of the present invention, the hypoglycemically-active N-(p-chlorobenzenesulfonyl) - N' - (p - dimethylaminophenyl)urea or one of its aforementioned pharmaceutically acceptable salts can be administered to the diabetically-afflicted subject via the oral route as previously indicated. In general, these compounds are most satisfactorily administered at a dosage level that is in the range of from about 75 mg. of about 2.25 g. per day in the order of about one to about five doses, although variations will necessarily occur depending upon the weight of the subject being treated. However, a dosage level that is in the range of from about 1.0 mg. to about 30 mg. per kg. of body weight per day is most desirably employed in order to achieve effective results. Nevertheless, it is to be appreciated that variations may also occur in this respect, depending upon the severity of the patient's condition and its individual response to said hypoglycemic agent, as well as on the particular oral formulation chosen and the time period and interval at which such administration is carried out. In some instances, dosage levels below the lower limit of the aforesaid range may be more than adequate, while in other cases still larger doses may be administered without causing any harmful or deleterious side effects to occur.

In connection with the use of N-(p-chlorobenzenesulfonyl)-N'-(p-dimethylaminophenyl)urea or one of its aforementioned pharmaceutically acceptable salts in the oral treatment of diabetes, it is to be noted that they may administered either alone or in combination with a pharmaceutically acceptable carrier, and that such administration can be in single or multiple doses. More particularly, the orally-effective, hypoglycemically-active compounds of this invention may be administered in suitable dosage forms providing a unit dosage of the essential active ingredient in an amount that is preferably at least 1.0 mg. per dosage unit, although concentration levels in the range of from about 1.0 mg. to about 30 mg. per unit dosage per day may be employed to advantage. For instance, dosage forms containing as high as 30 mg. of the active ingredient have been found to be particularly useful in combatting the hyperglycemia caused by this disease in extremely severe cases. When larger doses of this hypoglycemic agent are used, it is preferable to administer two or more unit doses at various time interval, adjusting, if necessary, the content of the antidiabetic agent per unit dosage form accordingly. Moreover, multiple dosage treatment has indicated the feasibility, in some instances, of administering the N-(p-chlorobenzenesulfonyl) - N' - (p - dimethylaminophenyl)urea - containing compositions at periodic intervals, i.e., by orally adminstering this hypoglycemic agent to an afflicted subject at a dosage level that is in the range of approximately 0.250–1.0 g. per day divided into about one to about five doses. Furthermore, optimum results can often be obtained in such cases by administering a higher dose initially, followed by the administration of a maintenance dose of therapy at a lower dosage level, say, for example, 1.0 g. the first day, 0.6 g. the second day, 0.4 g. the third day, and 0.2 g. per day thereafter.

It is apparent from the foregoing that the hypoglycemically-active compounds of this invention can be administered in a wide variety of oral dosage forms, i.e., they may be combined with various pharmaceutically acceptable inert carriers in the form of capsules, tablets, lozenges, troches, hard candies, aqueous suspensions, elixirs, etc. Such carriers include solid diluents or fillers, aqueous media, various non-toxic organic solvents, and the like. Moreover, these oral pharmaceutical compositions may be sweetened and/or flavored by means of various agents of the type commonly employed for such a purpose. In general, the arylsulfonylurea of this invention is present in such oral dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as alginic acid and certain complex silicates, together with binding agent such as polyvinylpyrrolidone, gelatin and acacia; in addition, lubricating agents, such as magnesium stearate, sodium lauryl sulfate and talc are often very useful for tabletting purposes. Solid compositions of a similar type may also be employed as fillers in soft and hard shelled gelatin capsules; preferred materials in this connection include polyethylene glycol, propylene glycol and glycerin as they not only may be used in this particular type of pharmaceutical dosage form as diluents, but also as plasticizing agents serving to protect the capsule against any leakage that might possibly occur due to denaturation of the gelatin. When aqueous suspensions and/or elixirs are desired for oral administration, the hypoglycemically-active ingredient may be combined with various sweetening and flavoring agents, coloring matter or dyes and, if so desired, emulsifying and/or suspending agents, together with such diluents as water, ethanol, propylene glycol, glycerin and various combinations thereof.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

A solution consisting of 6.42 g. (0.030 mole) of the monosodium salt of p-chlorobenzenesulfonamide and 13.28 g. (0.040 mole) of N,N-diphenyl-n'-(p-dimethylaminophenyl)urea dissolved in 25 ml. of anhydrous dimethylformamide was heated on a steam bath for about five hours. The reaction mixture was then cooled to room temperature and diluted with 200 ml. of water. After the resulting aqueous solution had been made strongly alkaline with 10% sodium hydroxide, it was extracted with several portions of diethyl ether, filtered and the resulting filtrate was slowly poured into a chilled aqueous solution containing an excess of hydrochloric acid; constant agitation was maintained throughout the latter step. The material which precipitated at this point was recovered by means of filtration, washed with cold water and subsequently air dried. There were obtained 5.4 g. (51%) of N - (p - chlorobenzenesulfonyl) - N' - (p - dimethylaminophenyl)urea, M.P. 160° C. (with decomposition); after one recrystallization from benzene, the melting point remained the same.

*Analysis.*—Calcd. for $C_{15}H_{16}ClN_3O_3S$: C, 50.92; H, 4.56; N, 11.88. Found: C, 50.71; H, 4.53; N, 11.57.

Example II

A solution consisting of 3.21 g. (0.015 mole) of the monosodium salt of p-chlorobenzenesulfonamide and 5.16 g. (0.020 mole) of phenyl N-(p-dimethylaminophenyl)carbamate dissolved in 15 ml. of dimethylformamide was heated on a steam bath for three hours. The reaction solution was then cooled to room temperature and diluted with 200 ml. of water. The resulting aqueous solution was then made strongly alkaline with 10 ml. of aqueous sodium carbonate, whereupon an oil was observed to separate from solution; the latter was removed by extracting the mixture with 50 ml. of diethyl ether. The so-treated aqueous layer was then filtered and the resulting filtrate was slowly poured into a chilled solution containing an excess of hydrochloric acid with constant agitation being maintained throughout the addition. The solid material which precipitated was collected by means of filtration, washed with cold water and subsequently air dried. There were obtained an almost quantitative yield of product which proved to be N-(p-chlorobenzenesulfonyl) - N' - (p - dimethylaminophenyl)urea, as attested to by its melting point and elementary microanalysis, as well as by the fact that no depression in melting point could be detected on admixture with an authentic sample via mixed melting point determinations; moverover, no differences could be observed when an infrared spectrum of this product was superimposed on that of an authentic sample.

This same product was also obtained in substantially the same yield by reacting 3.2 g. (0.015 mole) of the monosodium salt of p-chlorobenzenesulfonamide with 5.4 g. (0.020 mole) of phenyl N-(p-dimethylaminophenyl)thiolcarbamate in 20 ml. of dimethylsulfoxide in accordance with the above described procedure.

Example III

A solution consisting of 10.37 g. (0.064 mole) of p-dimethylaminophenyl isocyanate dissolved in 30 ml. of anhydrous dimethylformamide was added to a chilled suspension of 8.10 g. (0.042 mole) of p-chlorobenzenesulfonamide in 20 ml. of anhydrous triethylamine; the addition was carried out during the course of about 15 minutes with constant agitation being maintained throughout this step. After allowing the reaction mixture to stand at room temperature for about five days, it was then slowly added to one liter of chilled 50% aqueous acetic acid during the course of about one hour with constant agitation being maintained throughout the addition. The solid material which precipitated from solution at this point was recovered by means of filtration and subsequently washed with cold water. The product so obtained was then dissolved in cold 5% aqueous sodium carbonate and the resulting solution was immediately filtered. Isolation of the desired product from this filtrate was then effected by slowly pouring it into one liter of chilled 20% aqueous acetic acid, whereupon reprecipitation of the crystalline material occurred. The precipitate was then filtered, washed and subsequently air-dried to afford pure N-(p-chlorobenzenesulfonyl)-N'-(p-dimethylaminophenyl)urea, as attested to by melting point and mixed melting point determinations in the usual manner, as well as by a comparison of its infrared spectrum with that of an authentic sample obtained in the previous examples.

Example IV

The non-toxic acid addition salts of N-(p-chlorobenzenesulfonyl)-N'-(p-dimethylaminophenyl)urea are prepared by either one of two general methods. In the case of the hydrohalide salts, such as the hydrochloride, hydrobromide and hydroiodide, this is accomplished by first dissolving the amphoteric sulfonylurea in absolute ether followed by the introduction of the appropriate hydrogen halide gas into the solution until complete saturation is effected, whereupon the desired salt precipitates from solution; the crystalline product so obtained is then recrystallized from acetone to yield the pure hydrohalide salt. In the case of the corresponding nitrate, sulfate or bisulfate, phosphate or acid phosphate, acetate, lactate, citrate or acid citrate, tartrate or bitartrate, oxalate, succinate and maleate, the respective acid and the N-(p-chlorobenzenesulfonyl) - N' - (p - dimethylaminophenyl)urea are both separately dissolved in ethanol and the two solutions are then mixed, followed by the addition of diethyl ether to the resulting reaction mixture in order to effect precipitation of the desired acid addition salt from solution.

Example V

N-(p-chlorobenzenesulfonyl) - N' - (p-dimethylaminophenyl)urea is dissolved in an equimolar amount of a 15% aqueous sodium hydroxide solution at a temperature of approximately 40° C. The resulting solution is then adjusted to a pH of 7.5 by the addition of small amounts of either N - (p - chlorobenzenesulfonyl)-N'-(p-dimethylaminophenyl)urea or 15% sodium hydroxide solution as the case may be. The so-adjusted solution is then filtered and allowed to stand for some time in an ice-box until crystallization of the desired salt occurs, i.e., the sodium salt of N-(p-chlorobenzenesulfonyl)-N'-(p-dimethylaminophenyl)urea.

In like manner, N-(p-chlorobenzenesulfonyl)-N'-(p-dimethylaminophenyl)urea and lithium hydroxide react in accordance with this very same reaction procedure to afford the lithium salt of N-(p-chlorobenzenesulfonyl)-N'-(p-dimethylaminophenyl)urea.

Example VI

The procedure described in Example V is initially followed except that the concentration of the aqueous sodium hydroxide employed is such that it is sufficient to afford a 20% solution of said sulfonylurea compound. This solution is then heated to 80° C. and filtered, and the resulting filtrate treated with twice the equimolar amount of a 15% aqueous potassium carbonate solution at this same temperature. After cooling the reaction mixture to room temperature, crystallization of the so prepared potassium salt of N-(p-chlorobenzenesulfonyl)-N'-(p-dimethylaminophenyl)urea soon occurs.

Example VII

Equimolar amounts of N-(p-chlorobenzenesulfonyl)-N'-(p-dimethylaminophenyl)urea and freshly precipitated magnesium hydroxide are dissolved in a sufficient amount of water to afford a 20% solution. The solution is then heated to approximately 50° C. and filtered at that point. Upon evaporation of the resulting filtrate to dryness under reduced pressure at about 40° C., there is obtained a solid residual material which is the magnesium salt of N-(p-chlorobenzenesulfonyl)-N'-(p-dimethylaminophenyl)urea.

Example VIII

N-(p-chlorobenzenesulfonyl) - N' - (p-dimethylaminophenyl)urea is dissolved in the equimolar amount of triethanolamine and sufficient water to afford a 50% solution of said sulfonylurea. This solution is then heated to approximately 60° C., filtered at that point and the resulting filtrate poured into an aqueous calcium chloride solution containing 100 g. of calcium chloride dissolved in 100 ml. of water and whose temperature is also at 60° C. On cooling to room temperature and further standing for several hours, the calcium salt of N-(p-chlorobenzenesulfonyl) - N' - (p-dimethylaminophenyl)urea crystallizes from solution.

In like manner, the strontium and barium salts of N-(p-chlorobenzenesulfonyl) - N' - (p - dimethylaminophenyl)urea are also each individually obtained in accordance with this very same procedure by merely substituting the appropriate alkaline-earth metal chloride, i.e., either strontium chloride or barium chloride as the case may be, in place of the calcium chloride used above.

Example IX

N-(p-chlorobenzenesulfonyl) - N' - (p-dimethylaminophenyl)urea (3.53 g., 0.01 mole) is dissolved in 2 ml. of 10 N ammonium hydroxide at 60° C. The resulting solution is filtered immediately, and then allowed to cool to room temperature and further stand at that point for several hours until crystallization occurs. In this manner, white crystals of the ammonium salt of N-(p-chlorobenzenesulfonyl)-N'-(p - dimethylaminophenyl)urea are obtained from solution as a crystalline precipitate.

Example X

Equimolar amounts of N-(p-chlorobenzenesulfonyl)-N'-(p-dimethylaminophenyl)urea and monoethanolamine are dissolved in a sufficient amount of water at 58° C. to afford a 20% solution of the monoethanolammonium salt of said sulfonylurea, calculated on the basis of the free amphoteric compound. Upon evaporation of the so prepared aqueous solution under reduced pressure at 40° C., there is obtained a solid residual material which is the monoethanolammonium salt of N-(p-chlorobenzenesulfonyl)-N'-(p-dimethylaminophenyl)urea.

In like manner, N-(p-chlorobenzenesulfonyl)-N'-(p-dimethylaminophenyl)urea forms salts with diethanolamine, triethanolamine, ethylene diamine, diethylamine, triethylamine and pyridine by contacting the aforesaid amphoteric sulfonylurea with the appropriate lower alkanolamine or lower alkylamine as the case may be or with pyridine in accordance with this very same reaction procedure.

Example XI

A dry solid pharmaceutical composition was prepared by blending the following materials in the proportions by weight specified:

N-(p-chlorobenzenesulfonyl)-N'-(p-dimethylamino-
  phenyl)urea _____ 50
Sodium citrate _____ 25
Alginic acid _____ 10
Polyvinylpyrrolidone _____ 10
Magnesium stearate _____ 5

After the dried composition was thoroughly blended, tablets were punched from this mixture, each tablet being of such size that it contained 100 mg. of the active ingredient.

Example XII

A dry solid pharmaceutical composition was prepared by combining the following materials in the proportions by weight specified:

N-(p-chlorobenzenesulfonyl)-N'-(p-dimethylamino-
  phenyl)urea _____ 50
Calcium carbonate _____ 20
Polyethylene glycol (average molecular weight,
  4000) _____ 30

The dried solid mixture so prepared was thoroughly agitated so as to obtain a powdered product that was completely uniform. Soft elastic and hard filled gelatin capsules containing this pharmaceutical composition were then prepared, employing a sufficient quantity of material so as to furnish 250 mg. of the active ingredient in each capsule.

Example XIII

A liquid pharmaceutical composition was prepared by combining the following ingredients in the proportions by weight specified:

N-(p-chlorobenzenesulfonyl)-N'-(p-dimethylamino-
  phenyl)urea _____ 20
Citric acid _____ 20
Saccharin _____ 3
F. D. & C. Red _____ 1
Imitation wild cherry flavor _____ 1
Ethanol (95%) _____ 25
Water _____ 30

After the above liquid formulation was thoroughly mixed, the elixir so obtained contained approximately 200 mg. of the active ingredient per gram of solution.

Example XIV

A dilute aqueous-levulose solution of the magnesium salt of N-(p-chlorobenzenesulfonyl-N'-(p-dimethylaminophenyl)urea is prepared by dissolving said salt in a 50% levulose solution in such amount that each ml. of solution contains 75 mg. of the sulfonylurea calculated on the basis of its free amphoteric form. The so obtained solution can then be sweetened and/or flavored as desired in order to mask the taste of the essential active ingredient, and rendered more viscous by the addition of the appropriate amount of methyl cellulose.

This application is a continuation-in-part of U.S. patent application Serial No. 776,185, filed November 25, 1958 and now abandoned.

What is claimed is:

1. A compound selected from the group consisting of N-(p-chlorobenzenesulfonyl) - N' - (p - dimethylaminophenyl)urea and the acid addition salts, alkali metal salts, alkaline-earth metal salts, the ammonium salt, and the water-soluble amine addition salts thereof.

2. N-(p-chlorobenzenesulfonyl) - N' - (p - dimethylaminophenyl)urea.

3. The pharmaceutically acceptable acid addition salts of N-(p-chlorobenzenesulfonyl)-N'-(p - dimethylaminophenyl)urea.

4. The alkali metal salts of N-(p-chlorobenzenesulfonyl)-N'-(p-dimethylaminophenyl)urea.

5. The alkaline-earth metal salts of N-(p-chlorobenzenesulfonyl)-N'-(p-dimethylaminophenyl)urea.

6. The water-soluble amine addition salts of N-(p-chlorobenzenesulfonyl) - N' - (p-dimethylaminophenyl)-urea.

References Cited in the file of this patent

FOREIGN PATENTS

| F. 18,659 | Germany | Dec. 27, 1956 |
| | (Kl 12/o 17/03) | |
| 993,465 | France | July 25, 1951 |
| 919,464 | France | Nov. 25, 1946 |
| 120,428 | Sweden | Dec. 16, 1947 |

OTHER REFERENCES

Petersen: Berichte Der Deut. Chem. Gessell, vol. 83, pp. 552–554 (1950).

Mirsky: Yearbook of Endocrinology, 1955/1956, pp. 298–301.

Ruschig et al. Arzn. Forsch., vol. 8, No. 7a, pp. 448–454 (July 1958).